United States Patent [19]

Itoh et al.

[11] Patent Number: 5,302,187
[45] Date of Patent: Apr. 12, 1994

[54] CONCENTRATION PROCESS OF GASEOUS CHLORINE

[75] Inventors: Hiroyuki Itoh; Yoshitsugu Kono; Shinji Takenaka, all of Fukuoka; Yukihiro Yoshikawa, Chiba; Isao Kikuchi; Teruo Hirayama, both of Fukuoka, all of Japan

[73] Assignee: Mitsui Toatsu Chemicals, Incorporated, Tokyo, Japan

[21] Appl. No.: 975,158

[22] PCT Filed: Dec. 14, 1990

[86] PCT No.: PCT/JP90/01632

§ 371 Date: Aug. 15, 1991

§ 102(e) Date: Aug. 15, 1991

[87] PCT Pub. No.: WO91/08824

PCT Pub. Date: Jun. 27, 1991

Related U.S. Application Data

[63] Continuation of Ser. No. 752,606, Aug. 15, 1991, abandoned.

[30] Foreign Application Priority Data

Dec. 16, 1989 [JP] Japan .................. 1-324893
Mar. 27, 1990 [JP] Japan .................. 2-7500

[51] Int. Cl.5 ............................ B01D 53/04
[52] U.S. Cl. .............................. 95/11; 95/97; 95/132
[58] Field of Search ........ 55/58, 71, 74, 75, 20; 95/132, 11, 97; 96/111, 121, 133, 143

[56] References Cited

U.S. PATENT DOCUMENTS

| | | | |
|---|---|---|---|
| 1,617,305 | 2/1927 | Guyer et al. | 55/58 |
| 2,340,398 | 2/1944 | MacMullin | 55/71 X |
| 2,800,197 | 7/1957 | Wynkoop | 55/71 X |
| 3,001,607 | 9/1961 | Eng et al. | 55/71 X |
| 3,029,575 | 4/1962 | Eng et al. | 55/71 X |
| 3,038,326 | 6/1962 | DeFord | 55/20 X |
| 3,063,218 | 11/1962 | Pernert et al. | 55/71 |
| 3,197,942 | 8/1965 | Haisty et al. | 55/71 |
| 3,224,167 | 12/1965 | Jones | 55/71 X |
| 3,658,467 | 4/1972 | Maeck | 55/71 X |
| 4,127,395 | 11/1978 | McKey et al. | 55/20 |
| 4,264,339 | 4/1981 | Jüntgen et al. | 55/58 X |
| 4,557,921 | 12/1985 | Kirsch et al. | 55/75 X |
| 4,684,377 | 8/1987 | Haruna et al. | 55/75 X |
| 4,748,013 | 5/1988 | Saito et al. | 55/71 X |
| 4,762,537 | 8/1988 | Fleming et al. | 55/71 |
| 4,902,312 | 2/1990 | Chang | 55/71 |
| 4,980,139 | 12/1990 | Bosserman et al. | 55/71 X |
| 5,051,117 | 9/1991 | Prigge et al. | 95/132 X |

FOREIGN PATENT DOCUMENTS

| | | | |
|---|---|---|---|
| 1100603 | 3/1961 | Fed. Rep. of Germany | 55/71 |
| 55-027019 | 2/1980 | Japan | 55/71 |
| 0738644 | 6/1980 | U.S.S.R. | 55/71 |
| 1189490 | 11/1985 | U.S.S.R. | 55/71 |
| 2025254 | 1/1980 | United Kingdom . | |
| 2073043 | 10/1981 | United Kingdom . | |

*Primary Examiner*—Robert Spitzer
*Attorney, Agent, or Firm*—Millen, White, Zelano & Branigan

[57] ABSTRACT

Disclosed herein is a process comprising introducing a chlorine-containing gas through an adsorbent to adsorb chlorine and thereafter reducing the pressure of the adsorbent to a pressure lower than that during the introduction, thereby obtaining an effluent gas with a higher chlorine concentration than that of the introduced gas. Among preferably usable adsorbents are zeolite, non-zeolite-type porous acidic oxides and active carbon.

7 Claims, 1 Drawing Sheet

CONCENTRATION PROCESS OF GASEOUS CHLORINE

This application is a continuation of application Ser. No. 07/752,606, filed Aug. 15, 1991, now abandoned.

APPLICATION FIELD IN INDUSTRY

This invention relates to a process for concentrating chlorine by making use of the pressure swing adsorption process.

PRIOR ART

Chlorine is a very important industrial intermediate material so that it is used in a wide variety of chemical industries. Hence, installations for the separation and concentration of chlorine are scattered in wide areas.

In order to separate chlorine from a chlorine-containing gas, it has been known to date to compress and cool the gas to produce liquid chlorine for its separation from the gas, or to allow a chlorine-containing organic solvent to absorb chlorine and strip the chlorine-absorbed solvent to separate the chlorine.

However, the former process deals with high pressure gases, necessitating gas compressors and cooling facilities which are expensive as well as troublesome in maintenance. Particularly, where chlorine is separated from a gas of relatively low chlorine concentration, a very high pressure or extremely low temperature operation is needed, demanding increased equipment costs. Further, the latter process generally employs a solvent of carbon tetrachloride, the use of which tends to be prohibited in recent years due to the environmental issues caused by freon gas, so that the process may not be said useful even in the future.

PROBLEMS TO BE SOLVED BY THE INVENTION

Where chlorine is separated from a chlorine-containing gas in such ways, particularly when it is separated from a gas of relatively low chlorine concentration, no effective process is found in the existing state of art. The present invention lies in providing a process for separating chlorine from a chlorine-containing gas and concentrating the chlorine, which is not restricted by the law dealing with high pressure gases and is free from the environmental issues caused by solvents.

MEANS TO SOLVE THE PROBLEMS

As a means often employed for separating gases, there is cited the pressure swing adsorption process, which is commonly used to increase the purities of oxygen/nitrogen and carbon monoxide/hydrogen. Prior art has been studied previous to the examination, but no prior literatures/art are found with regard to chlorine.

Then, the present inventors have made intensive investigations into the separation of chlorine from a chlorine-containing gas by means of pressure swing adsorption and finally found that the chlorine can be separated effectively by the use of zeolite, active carbon and non-zeolite-type porous acidic oxides as the adsorbent, leading to completion of the present invention.

BEST MODE FOR PRACTICING THE INVENTION

Figure 1:
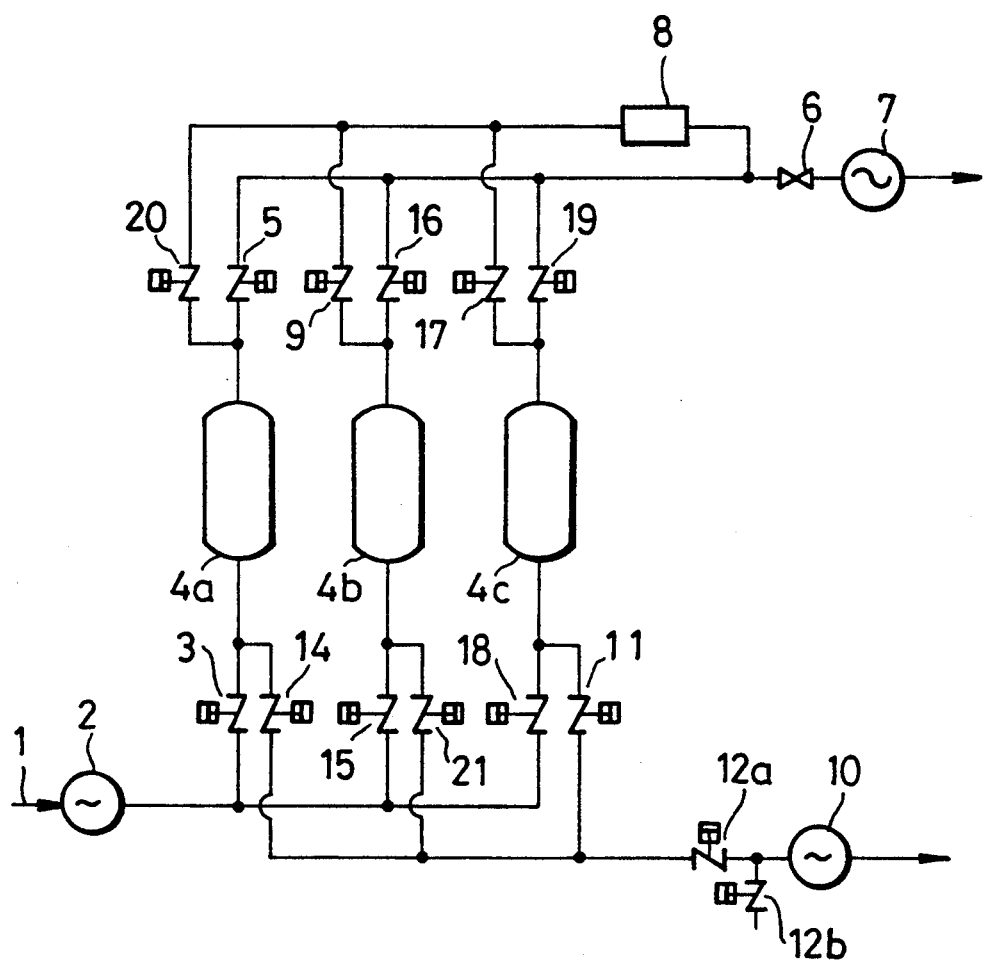
FIG. 1 is a schematic drawing of a facility in which a plural number of adsorption columns ($4a$, $4b$ and $4c$) are used for the purpose of practicing the present invention particularly in a continuous manner. The feed gas is sent to an adsorption column by a compressor 2 through line 1, and the gas having chlorine removed in the adsorption column is sent out of the system by a blower 7. On the other hand, the gas of an increased chlorine concentration evolved by desorption is sent to the outside of the system by a vacuum pump 10. Numeral 8 is a flow control mechanism, while numerals 3, 5, 9, 11, $12a$, $12b$ and 14 to 21 represent valves.

The present invention relates to a process for concentrating gaseous chlorine, which comprises introducing a chlorine-containing gas into an adsorption column packed with a chlorine-adsorbable adsorbent to adsorb particularly chlorine, stopping then the introduction of the gas and reducing the pressure of the adsorbent to a lower pressure than that employed in the introduction of the gas for the adsorption to desorb the gaseous chlorine having been adsorbed, thereby obtaining a gas with a chlorine concentration higher than that of the introduced gas and simultaneously regenerating the adsorbent, the thus-regenerated adsorbent being optionally used again for the aforesaid chlorine adsorption.

The chlorine-containing gas to which the process of the present invention is applied may contain oxygen, nitrogen, carbon dioxide, carbon monoxide, hydrogen, argon, hydrocarbons such as methane, etc. in addition to chlorine. However, in order to separate chlorine from a gas containing these gaseous components by the pressure swing adsorption process, it is necessary to select adsorbents whose adsorption affinity to these gaseous components is quite different from that to chlorine. As the adsorbents of chlorine useful in the practice of the present invention, synthetic and natural zeolite, non-zeolite-type porous acidic oxides, and carbonaceous adsorbents such as active carbon and molecular sieve carbon are chosen. As the zeolite may be mentioned, for example, the A-type, X-type, Y-type, L-type, ZSM-type, natural mordenite, etc., among which the X-type, Y-type, L-type and ZSM-type are preferred. Particularly preferred is zeolite of high silicon contents The non-zeolite-type porous acidic oxides may include alumina, silica, silica-alumina, titania, magnesia, etc. The active carbon useful as the adsorbent may embrace those derived from fruit shells, wood, coal, oil, etc., among which molecular sieve carbon and coconut shell active carbon are preferred. Since chlorine has a stronger affinity to these adsorbents than the aforementioned gases, it is adsorbed preferentially over other gases when a chlorine-containing gas is introduced into an adsorption column packed with these adsorbents, so that a gas with a low chlorine concentration or occasionally a gas containing chlorine to a hardly detectable extent can be obtained at the gas outlet of the adsorption column.

No particular limitations are imposed on the chlorine concentration of the chlorine-containing gas to be subjected to adsorption by the adsorbent, but 5–80% chlorine concentration is usually employed. Where the chlorine concentration is low, it is advisable to prolong the time of adsorption including regeneration operation through desorption.

Here, the operation pressure in the adsorption operation should be higher than that in the subsequent chlorine desorption operation.

The operation temperature is determined depending on the kind of zeolite packed, the kinds of gases other than chlorine contained in the introduced gas and the economical aspects. For instance, where Y-type zeolite is used as the adsorbent and carbon dioxide is admixed in the carrier gas, even room temperatures are enough to carry out chlorine adsorption.

On the other hand, it is preferable that the water content in the feed gas is as low as possible with a view to preventing deterioration of packings and materials of the installation. Hence, water contents of 1,000 ppm or less are desired.

Supply of the chlorine-containing feed gas to the adsorption column is stopped when the adsorption of chlorine to the adsorption column proceeds near its saturation. Subsequently, the operation pressure of the adsorption column is reduced to desorb the chlorine and other gases having been adsorbed. The operation pressure at this moment should be lower than that of the adsorption, and it is also effective to reduce the pressure below atmospheric by means of a vacuum pump as required. The operation temperature is optional, but it is basically more economical to adopt the same temperature as that of the adsorption. Of course, if economically effective, it is also possible to incorporate, what is called, the thermal swing process.

Further, it is a preferred embodiment to introduce a small amount of an inert gas, preferably gaseous nitrogen, during the desorption operation, because the desorption of gaseous chlorine from the adsorbent is thereby promoted.

By this desorption operation, it is possible to obtain a gas with a higher chlorine concentration than that of the introduced gas as well as to regenerate the chlorine-adsorbed adsorbent through desorption of chlorine, thus permitting the succeeding adsorption operation to be repeated.

An embodiment of the present invention in a more concrete form on an industrial scale will be illustrated hereunder. Its mode is shown in FIG. 1.

In FIG. 1, a chlorine-containing feed gas is sent via line 1 to a gas compressor 2 where it is compressed to a predetermined pressure. Then, the gas is introduced via a valve 3 into a first adsorption column 4a, one of three adsorption columns 4a, 4b and 4c. In the three adsorption columns 4a, 4b and 4c, the aforesaid adsorbent that effects preferential adsorption of chlorine is packed independently so that chlorine in the feed gas introduced under pressure is adsorbed preferentially and hence a gas of low chlorine content or occasionally a gas containing chlorine to a hardly detectable extent (hereinafter referred to as the treated gas) is obtained at the outlet of the adsorption column 4a. The dechlorinated gas is discharged by a blower 7 through a valve 5 and a valve 6.

At this moment, in the second adsorption column 4b, a pressurizing process wherein the pressure in the column is increased by the treated gas is being carried out by introducing a part of the treated gas discharged from the first adsorption column 4a into the second adsorption column 4b via a flow control mechanism 8 and a valve 9 Further, in the third adsorption column 4c, a regeneration process wherein the adsorbent in the column is regenerated under reduced pressure is being carried out by connecting the column to a vacuum pump 10 through valves 11 and 12a.

Then, in the adsorption column 4a which has adsorbed a certain amount of chlorine and is almost saturated with chlorine, the introduction of the feed gas is stopped by switching a valve 3, and at the same time the column is exhausted by the vacuum pump 10 to a vacuum by switching a valve 14, the chlorine having been adsorbed by the adsorbent being desorbed to regenerate the adsorbent (regeneration step). In this regeneration step, a gas of high chlorine concentration can be obtained as a product at the outlet of the vacuum pump 10, the gas containing chlorine at high concentration being sent to a consumer step in the downstream.

At this time, in the second adsorption column 4b, the feed gas is introduced via a valve 15, and the treated gas is withdrawn from the outlet of the column and sent via a valve 16 and the valve 6 to the blower 7 by means of which it is sent further to a consumer step. Further, in the third adsorption column 4c, a portion of the treated gas discharged from the second adsorption column 4b is admitted via the flow control mechanism 8 and a valve 17, so that the pressurizing process wherein the pressure in the column is increased by the treated gas is being carried out.

Thereafter, in the third adsorption column 4c, the feed gas is introduced via a valve 18, and the treated gas is sent via a valve 19 and the valve 6 to the blower 7 for its discharge. Simultaneously in the first adsorption column 4a, a part of the treated gas discharged from the third adsorption column 4c is admitted via the flow control mechanism 8 and a valve 20, so that the pressurizing process wherein the pressure in the column is increased by the treated gas is being carried out.

At this moment, in the second adsorption column 4b, the introduction of the feed gas is stopped by switching the valve 15, and simultaneously the valve 21 is switched to exhaust the column to a vacuum by the vacuum pump 10, the chlorine having been adsorbed in the adsorbent being thus desorbed so that the adsorbent is regenerated.

In the same manner as described above, this series of operations are repeated in sequence with the three adsorption columns 4a, 4b and 4c, so that chlorine can be separated from a chlorine-containing feed gas and a gas of a higher chlorine concentration than that of the feed gas can be obtained continuously.

EFFECTS OF THE INVENTION

The present invention provides a process for the easy separation/concentration of chlorine from a chlorine-containing gas by the application of the pressure swing adsorption process and hence its industrial value is very high.

EXAMPLES

The present invention will be illustrated more specifically with reference to the following examples.

EXAMPLE 1

A gas consisting of chlorine (15%), carbon dioxide (15%) and oxygen (70%) was introduced into a stainless steel adsorption column packed with 40 g of synthetic Y-type zeolite (product of Zeochem) at 25–30° C. under a controlled pressure of 5 atm. at a rate of 200 ml/min for 12 minutes. During this period, the gas coming out of the column was subjected to gas chromatography to analyze the gas composition. As a result, 100–300 ppm of gaseous chlorine was detected. Upon completion of the gas adsorption, the supply of the feed gas was stopped and the adsorption column was evacuated at a pressure of 60 mmHg abs. for 5 minutes by a vacuum pump to desorb gaseous chlorine. Analysis of the desorbed gas revealed that its chlorine concentration was 78%. A gas of the same composition as described above was passed again through the column having undergone the desorption under the same conditions. The chlorine concentration of the effluent gas during 12 minutes was also 100–300 ppm.

EXAMPLE 2

A gas consisting of chlorine (5%), carbon dioxide (15%) and helium (80%) was introduced into a stainless steel adsorption column packed with 40 g of synthetic Y-type zeolite (product of Zeochem) at 25–30° C. under a controlled pressure of 5 atm. at a rate of 200 ml/min for 25 minutes. During this period, the gas coming out of the column was subjected to gas chromatography to analyze the gas composition. As a result, 100–300 ppm of gaseous chlorine was detected. Upon completion of the gas adsorption, the supply of the feed gas was stopped and the adsorption column was evacuated at a pressure of 60 mmHg abs. for 5 minutes by a vacuum pump to desorb gaseous chlorine. Analysis of the desorbed gas revealed that its chlorine concentration was 55%. A gas of the same composition as described above was passed again through the column having undergone the desorption under the same conditions. The chlorine concentration of the effluent gas during 25 minutes was also 100–300 ppm.

EXAMPLE 3

A gas consisting of chlorine (15%), nitrogen (15%) and helium (70%) was introduced into a stainless steel adsorption column packed with 40 g of synthetic Y-type zeolite (product of Zeochem) at 25–30° C. under a controlled pressure of 5 atm. at a rate of 200 ml/min for 12 minutes. During this period, the gas coming out of the column was subjected to gas chromatography to analyze the gas composition. As a result, 100–300 ppm of gaseous chlorine was detected. Upon completion of the gas adsorption, the supply of the feed gas was stopped, and the adsorption column was evacuated at a pressure of 60 mmHg abs. for 5 minutes by a vacuum pump and then passed with gaseous nitrogen at a rate of 7 ml/min for 3 minutes to desorb gaseous chlorine.

Analysis of the desorbed gas revealed that its chlorine concentration was 83%. A gas of the same composition as described above was passed again through the column having undergone the desorption under the same conditions. The chlorine concentration of the effluent gas during 12 minutes was also 100–300 ppm.

EXAMPLE 4

A gas consisting of chlorine (15%), carbon dioxide (15%) and helium (70%) was introduced into a stainless steel adsorption column packed with 40 g of synthetic 13X-type zeolite (product of Fuji Devison) at 60° C. under a controlled pressure of 5 atm. at a rate of 200 ml/min for 6 minutes. During this period, the gas coming out of the column was subjected to gas chromatography to analyze the gas composition. As a result, 200–500 ppm of gaseous chlorine was detected. Upon completion of the gas adsorption, the supply of the feed gas was stopped and the adsorption column was evacuated at a pressure of 60 mmHg abs. for 5 minutes by a vacuum pump to desorb gaseous chlorine. Analysis of the desorbed gas revealed that its chlorine concentration was 72%. A gas of the same composition as described above was passed again through the adsorption column having undergone the desorption under the same conditions. The chlorine concentration of the effluent gas during 6 minutes was also 200–500 ppm.

EXAMPLE 5

A gas consisting of chlorine (15%), carbon dioxide (15%) and helium (70%) was introduced into a stainless steel adsorption column packed with 30 g of gas-adsorptive active carbon PCB (product of Toyo Calgon) at 60° C. under a controlled pressure of 5 atm. at a rate of 200 ml/min for 6 minutes. During this period, the gas coming out of the column was subjected to gas chromatography to analyze the gas composition. As a result, 300–800 ppm of gaseous chlorine was detected. Upon completion of the gas adsorption, the supply of the feed gas was stopped and the adsorption column was evacuated at a pressure of 60 mmHg abs. for 5 minutes to desorb gaseous chlorine. Analysis of the desorbed gas revealed that its chlorine concentration was 72%. A gas of the same composition as described above was passed again through the adsorption column having undergone the desorption under the same conditions. The chlorine concentration of the effluent gas during 6 minutes was also 300–800 ppm.

EXAMPLE 6

A gas consisting of chlorine (15%), carbon dioxide (15%) and helium (70%) was introduced into a stainless steel adsorption column packed with 30 g of molecular sieve carbon MSC (product of Takeda Chemical Industries) at 60° C. under a controlled pressure of 5 atm. at a rate of 200 ml/min for 6 minutes. During this period, the gas coming out of the column was subjected to gas chromatography to analyze the gas composition. As a result, 200–500 ppm of gaseous chlorine was detected. Upon completion of the gas adsorption, the supply of the feed gas was stopped and the adsorption column was evacuated at a pressure of 60 mmHg abs. for 5 minutes by a vacuum pump to desorb gaseous chlorine. Analysis of the desorbed gas revealed that its chlorine concentration was 79%. A gas of the same composition as described above was passed again through the adsorption column having undergone the desorption under the same conditions. The chlorine concentration of the effluent gas during 6 minutes was also 200–500 ppm.

EXAMPLE 7

A gas consisting of chlorine (15%), carbon dioxide (15%) and helium (70%) was introduced into a stainless steel adsorption column packed with 30 g of silica at 60° C. under a controlled pressure of 5 atm. at a rate of 200 ml/min for 6 minutes. During this period, the gas coming out of the column was subjected to gas chromatography to analyze the gas composition. As a result, 200–500 ppm of gaseous chlorine was detected. Upon completion of the gas adsorption, the supply of the feed gas was stopped and the adsorption column was evacuated at a pressure of 60 mmHg abs. for 5 minutes by a vacuum pump to desorb gaseous chlorine. Analysis of the desorbed gas revealed that its chlorine concentration was 79%. A gas of the same composition as described above was passed again through the adsorption column having undergone the desorption under the same conditions. The chlorine concentration of the effluent gas during 6 minutes was also 200–500 ppm.

Application Manner in Industries

The present invention provides a process wherein a chlorine gas of relatively high chlorine concentration is recovered from that of relatively low chlorine concentration by the use of adsorbents, the process being not affected by the law dealing with high pressure gases nor necessitating regeneration of solvents.

The apparatus of the process if utilized as an ancillary facility in installations making use of chlorine.

We claim:

1. A process for concentrating gaseous chlorine comprising:
    (a) introducing a gas containing carbon dioxide and chlorine into an adsorption column packed with a Y-type zeolite as a chlorine-adsorbable adsorbent to selectively separate the chlorine from the gas so that a substantially chlorine-free gas is obtained;
    (b) stopping the introduction of the gas; and
    (c) reducing the pressure of the adsorbent to a lower pressure than that during the gas introduction to desorb the chlorine, thereby obtaining a second gas having a chlorine concentration higher than that of the introduced gas, as well as regenerating the adsorbent.

2. A process according to claim 1, wherein the water content of the gas containing carbon dioxide and chlorine is 1000 ppm or less.

3. A process for separating substantially pure gaseous chlorine from a stream of mixed gases comprising chlorine and carbon dioxide and having a water content of 1000 ppm or less, which comprises the steps of
    (a) passing the stream of mixed gases through a column packed with an amount of Y-type zeolite as a chlorine-adsorbable adsorbent effective to selectively separate the chlorine from the mixed gases so that a substantially chlorine-free gas is discharged from the column;
    (b) monitoring the chlorine content of the gas discharged from the column;
    (c) continuing the passage of the stream mixed gases through the column until the column becomes nearly saturated with chlorine;
    (d) then stopping the introduction of the stream of mixed gases into the column;
    (e) reducing the pressure in the column to a pressure lower than that of the period when the mixed gases were passed through, thereby releasing a gaseous stream from the column having a chlorine concentration higher than that of the mixed gases, as well as regenerating the adsorbent;
    (f) recovering the chlorine released from the column; and
    (g) repeating steps (a) through (e) employing the thus-regenerated column of adsorbent.

4. The process of claim 3, wherein the chlorine concentration of the stream of substantially chlorine-free gas discharged from the column is from 100-800 ppm.

5. The process of claim 3, wherein the chlorine concentration of the stream of mixed gases introduced into the column has a chlorine content of 5-80%.

6. The process of claim 3, wherein the stream of mixed gases is introduced into the column in step (a) at superatmospheric pressure and the pressure is reduced in step (e) to below atmospheric.

7. The process according to claim 3, wherein the chlorine concentration of the stream of substantially chlorine-free gas discharged from the column is from 100-800 ppm; wherein the mixed gases introduced into the column has a chlorine content of 5-80%; wherein the adsorbent is Y-type zeolite; and wherein the stream of mixed gases is introduced into the column in step (a) at superatmospheric pressure and the pressure is reduced in step (e) to below atmospheric.

* * * * *

UNITED STATES PATENT AND TRADEMARK OFFICE
CERTIFICATE OF CORRECTION

PATENT NO. : 5,302,187
DATED : April 12, 1994
INVENTOR(S) : Hiroyuki ITOH et al.

It is certified that error appears in the above-identified patent and that said Letters Patent is hereby corrected as shown below:

Title Page:   Item (30) Foreign Application Priority Data

Change "2-7500" to read . . .

-- 75500 --

Signed and Sealed this

Ninth Day of August, 1994

Attest:

BRUCE LEHMAN

Attesting Officer    Commissioner of Patents and Trademarks